United States Patent
Ladikov

(10) Patent No.: US 10,019,587 B2
(45) Date of Patent: Jul. 10, 2018

(54) SYSTEM AND METHOD FOR GENERATING APPLICATION CONTROL RULES

(71) Applicant: Kaspersky Lab ZAO, Moscow (RU)

(72) Inventor: Andrey V. Ladikov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/701,636

(22) Filed: May 1, 2015

(65) Prior Publication Data
US 2016/0246973 A1 Aug. 25, 2016

(30) Foreign Application Priority Data
Feb. 20, 2015 (RU) ................................ 2015105808

(51) Int. Cl.
| G06F 17/00 | (2006.01) |
| H04L 29/06 | (2006.01) |
| G06F 21/60 | (2013.01) |
| G06F 17/30 | (2006.01) |

(52) U.S. Cl.
CPC ...... *G06F 21/604* (2013.01); *G06F 17/30598* (2013.01)

(58) Field of Classification Search
CPC ................................ G06F 15/16; G06F 12/14
USPC .......................................................... 726/24
See application file for complete search history.

(56) References Cited

U.S. PATENT DOCUMENTS

| 6,341,369 | B1 | 1/2002 | Degenaro et al. |
| 7,062,649 | B2 * | 6/2006 | Daniell ............... G06F 21/6218 713/165 |
| 7,296,288 | B1 * | 11/2007 | Hill ..................... H04L 41/0896 713/194 |
| 7,392,544 | B1 | 6/2008 | Pavlyushchik |
| 8,001,606 | B1 | 6/2011 | Spertus |
| 8,296,255 | B1 * | 10/2012 | Wawda ............. G06F 17/30876 706/48 |
| 8,364,776 | B1 * | 1/2013 | Conrad ............... H04L 63/1416 709/206 |
| 8,484,695 | B2 | 7/2013 | Mackinnon et al. |
| 8,813,060 | B2 | 8/2014 | Tewari et al. |

(Continued)

FOREIGN PATENT DOCUMENTS

RU    2202122 C2    4/2003

OTHER PUBLICATIONS

Russian Search Report for 2015105808 dated Dec. 1, 2015.

*Primary Examiner* — Morshed Mehedi
*Assistant Examiner* — Dereena T Cattungal
(74) *Attorney, Agent, or Firm* — Arent Fox LLP; Michael Fainberg

(57) ABSTRACT

Disclosed is a system and method for configuring control rules for applications executable on a computer. An example method includes classifying computer applications into one of a plurality of classification groups that include at least one predetermined classification group and an unknown classification group. The method further includes configuring control rules when the applications are classified in the unknown classification group that is done by determining, by the hardware processor, a computer competency score for a user of the computer; categorizing the applications into one or more predefined categories, and defining control rules for the application based on the determined computer competency score for the user and the one or more predefined categories of the at least one application.

17 Claims, 3 Drawing Sheets

(56) References Cited

U.S. PATENT DOCUMENTS

| | | | |
|---|---|---|---|
| 8,826,444 B1* | 9/2014 | Kalle | H04N 21/25816 |
| | | | 709/223 |
| 8,918,387 B1* | 12/2014 | Sokolov | G06F 21/57 |
| | | | 707/707 |
| 8,943,547 B2 | 1/2015 | Kazachkov et al. | |
| 8,959,580 B2 | 2/2015 | Lim | |
| 9,203,860 B1* | 12/2015 | Casillas | H04L 63/1433 |
| 2002/0099952 A1* | 7/2002 | Lambert | G06F 21/51 |
| | | | 726/27 |
| 2006/0265760 A1* | 11/2006 | Daemke | G06F 21/604 |
| | | | 726/27 |
| 2007/0174437 A1 | 7/2007 | Kraus | |
| 2008/0133540 A1* | 6/2008 | Hubbard | H04L 63/101 |
| 2010/0083376 A1 | 4/2010 | Pereira et al. | |
| 2011/0159233 A1* | 6/2011 | Marissen | B29C 47/0014 |
| | | | 428/98 |
| 2012/0266244 A1 | 10/2012 | Green et al. | |
| 2012/0272290 A1 | 10/2012 | Zaitsev et al. | |
| 2013/0159233 A1* | 6/2013 | Mason | G06F 17/30864 |
| | | | 706/45 |
| 2013/0159826 A1* | 6/2013 | Mason | G06F 17/30873 |
| | | | 715/205 |
| 2014/0245376 A1* | 8/2014 | Hibbert | H04L 63/1433 |
| | | | 726/1 |
| 2015/0007252 A1 | 1/2015 | Kazachkov et al. | |
| 2015/0254555 A1* | 9/2015 | Williams, Jr. | G06N 3/0454 |
| | | | 706/14 |
| 2015/0356451 A1* | 12/2015 | Gupta | G06N 99/005 |
| | | | 706/52 |
| 2016/0098560 A1* | 4/2016 | Friedrichs | G06F 21/56 |
| | | | 726/23 |

* cited by examiner

SYSTEM AND METHOD FOR GENERATING APPLICATION CONTROL RULES

CROSS-REFERENCE TO RELATED APPLICATIONS

This application claims benefit of priority under 35 U.S.C. 119(a)-(d) to a Russian Application No. 2015105808 filed on Feb. 20, 2015, which is incorporated by reference herein.

FIELD OF TECHNOLOGY

The present disclosure relates generally to the field of computer security, and more specifically, to a system and method that generates application control rules.

BACKGROUND

The number of conceivable applications (software) that can be used on computing devices, including personal computers, is increasing today like an avalanche. Among the multiplicity of applications, there are many malicious programs that can inflict harm on a computer or a computer user, such as Internet worms, keyloggers, and/or computer viruses.

The problem of protecting a group of computing devices is especially urgent for administrators of computer networks, where a large number of applications can be installed on each computer in the network, some of which may be harmful. To handle this problem, one common approach is to use application control systems where the network administrator has access to the applications being executed on the computers in the network by using a combination of a centralized control module and a group of clients on the side of the computers of a corporate network that can execute commands received from the centralized control module. By using such a system, the network administrator can create rules to allowing prohibit applications from being executed on the computers in the network and also control access of those applications to the resources of the computers in the network.

One common way of using application control systems is a default denial that allows the use of only a example group of software on a computer. Such a group may consist, for example, of software which is present on a list of trusted applications (i.e., a whitelist). This approach can safeguard computers by restricting them from executing malicious software.

For computers on which only software from a list of trusted applications can be installed and used, the use of the aforementioned approach is justified and does not present any difficulties. However, this approach has a drawback—on computers where software is present that does not appear on the lists of trusted applications, but also is not harmful, this software, which may be a large quantity of software, will be blocked.

Known solutions to this problem involve modifying the application control rules. However, these approaches do not solve the problem of forming the application control rules from the standpoint of the safety of the computing device or they do not solve the problem effectively enough. Accordingly, there is a need in the field of computer security for more effective methods of generating application control rules.

SUMMARY

The present invention enables an effective solution for the foregoing problems of application control. Disclosed are example systems, methods and computer program products for configuring control rules for applications executable on a computer.

In one aspect, an example method is disclosed for configuring control rules for applications executable on a computer, the method including classifying, by a hardware processor, at least one computer application into one of a plurality of classification groups that include at least one predetermined classification group and an unknown classification group; and configuring at least one control rule when the at least one application is classified in the unknown classification group; wherein the configuring of the at least one control rule includes: determining, by the hardware processor, a computer competency score for a user of the computer; categorizing the at least one application into one or more predefined categories, and defining control rules for the at least one application based on the determined computer competency score for the user and the one or more predefined categories of the at least one application.

In another aspect, the at least one predetermined classification group include a trusted application group and an untrusted application group.

In another aspect, the categorizing of the example method includes using one or more of information relating to functions of the computer used by the at least one application, a purpose of the at least one application, and a criticality score of the at least one application.

In another aspect, the determining of the computer competency score of the user is based at least on user information and computer information.

In another aspect, the user information includes one or more of a security access level of the user, social network profile information of the user, and personal information of the user.

In another aspect, the social network profile information of the user and/or the personal information of the user includes at least one of job position, company name, and field of employment.

In another aspect, the computer information includes at least one of computer security event log, network resources access log, and the one or more predefined categories of the at least one application.

In another aspect, the criticality score of the at least one application comprises calculating the criticality score according to:

$$C = \Sigma a_i C_i^{b_i},$$

wherein C is the criticality score, $a_i$ is a weight of i-th category, $C_i$ is a criticality score of i-th category, and $b_i$ is a power coefficient for i-th category.

In another aspect a system is disclosed for configuring control rules for applications executable on a computer, the system comprising: a hardware processor configured to: classify at least one computer application into one of a plurality of classification groups that include at least one predetermined classification group and an unknown classification group; and configure at least one control rule when the at least one application is classified in the unknown classification group by: determining a computer competency score for a user of the computer; categorizing the at least one application into one or more predefined categories, and defining control rules for the at least one application based on the determined computer competency score for the user and the one or more predefined categories of the at least one application.

In another aspect, a non-transitory computer readable medium storing computer executable instructions for configuring control rules for applications executable on a computer is disclosed, that includes instructions for: classifying, by the hardware processor, at least one computer application into one of a plurality of classification groups that include at least one predetermined classification group and an unknown classification group; and configuring at least one control rule when the at least one application is classified in the unknown classification group; wherein the configuring of the at least one control rule includes: determining, by the hardware processor, a computer competency score for a user of the computer; categorizing the at least one application into one or more predefined categories, and defining control rules for the at least one application based on the determined computer competency score for the user and the one or more predefined categories of the at least one application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for controlling applications executed on a computer. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
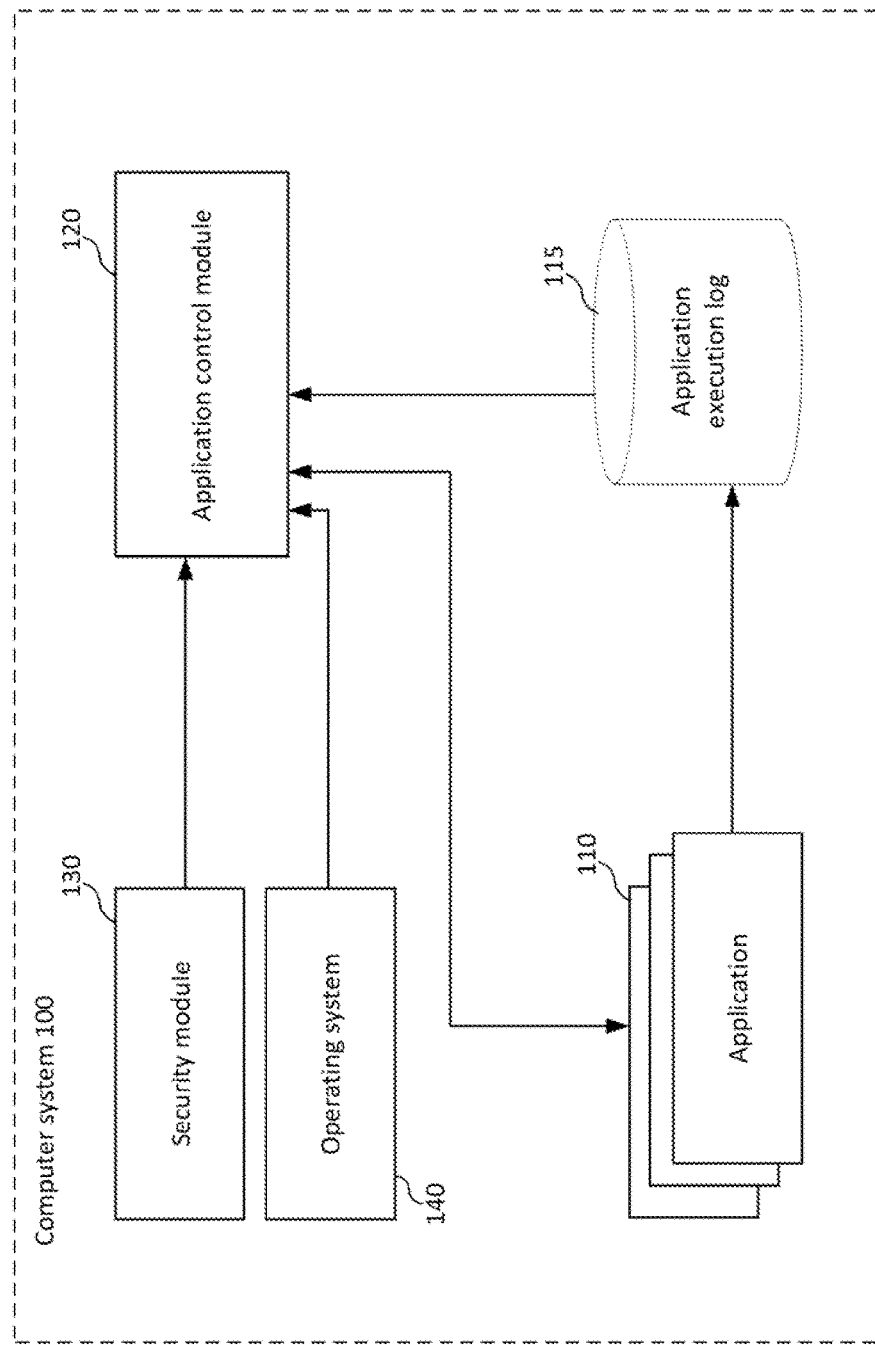
FIG. 1 illustrates a schematic diagram of the example system for configuring control rules for applications executable on a computer.

FIG. 1 illustrates a schematic diagram of the example system for configuring control rules for applications executable on a computer. The computer system 100, additional details of which will be shown in FIG. 3, can be any given computing device, such as a mobile computing device. According to the example aspect, various software can function within the computer system 100, such as a security module 130, to protect the computer system against harmful objects (i.e., objects that can inflict harm on the computer or the computer user, such as Internet worms, keyloggers, computer viruses, as well as references to these objects like URL's) As further shown, the computer system 100 includes an application control module 120 that monitors the running and execution of applications, an operating system ("OS") 140 that controls the access to the resources of the computer 100 (e.g., processor, random access memory, data storage devices), for example, used by applications. In one example aspect, the security module 130 can be antivirus software. Likewise, one or more software application(s) 110 can be run on the computer 100, such as applications for working/transacting with banks, working in peer-to-peer networks, exchanging messages, managing document flows, and web browsing (e.g., Internet browsers).

As further shown, the computer system 100 can include application execution log 115, which is a set of resources designed to save the data created by the applications 110 in the course of their operation and/or installation. In one aspect, the application execution log 115 can include a system registry (not shown) that saves the various settings of the software and hardware of the computer system 100 used by the applications 110. In yet another aspect, the application execution log 115 can include volatile and nonvolatile memory devices as well as their parts or partitions used by the applications 110. In the general case, the application execution log 115 saves the settings of the applications 110, the log of events occurring during the execution, such as the result of a checking of files and a log containing information on the detection of harmful objects for the security module 130 and the exchange of messages (i.e., the history of sent and received messages) for an application 110, and files which can be created during the operation of the application 110.

As previously mentioned, the application control module 120 is designed to monitor the running and execution of applications. In the example aspect, the application control module 120 generates or defines and uses rules regulating its behavior in various situations (i.e., the monitoring of said software, such as the actions of this software). In a example aspect, such rules define the working of the application control module 120 during the running and execution of various applications 110 and also applications from different groups. According to one example aspect, groups for the various applications 110 can be (i) trusted software, (ii) malicious software, and (iii) unclassified (e.g., unknown) software. The group of trusted software can include, for example, applications 110 that do not cause harm to the computer system 100 or whose origin or author is known to be trusted. According to one aspect, applications 110 can be classified in the group of trusted software if they are signed by a trusted digital signature in accordance with the X.509 standard, for example. In yet another aspect, the trusted software group can contain applications about which information (such as a check sum) is stored in a database of trusted applications, which can reside either within the computer system 100 or on a remote server. In yet another aspect, the group of trusted software can also include applications 110 downloaded from a trusted resource, such as a site with a trusted digital certificate.

According to another example aspect, the group of malicious software can include applications 110 that cause harm to the computer 100. According to one example aspect, applications 110 can be classified in the group of malicious software if corresponding information arrives at the application control module 120 from the security module 130, for example, a verdict of detection of a malicious object by the security module 130. In yet another example aspect, this group can contain applications about which information (such as a check sum) is stored in a database of malicious applications, which may reside either within the computer 100 or on a remote server.

According to one example aspect, the group of unclassified (unknown) software may contain applications 110 that are not contained in the groups of trusted software or malicious software. In one example aspect, unclassified software created by trusted software is likewise considered to be trusted (for example, executable files created by a trusted development environment). In an example aspect, the corresponding information (including the "parent-child" relation between creating and created application) may be saved in the aforementioned database of trusted applications, which can reside either within the computer 100 or on a remote server.

In yet another example aspect, unclassified software created with the aid of malicious software is also deemed to be malicious.

In one example aspect, the fact of one application creating another one is ascertained with the aid of the security module 130.

In one example aspect, the control module 120 uses application control rules to monitor the launching and execution of applications 110 (or a group of software). According to one aspect, the control rules can have the form of (i) preventing the running of malicious software; (ii) allowing the running of only trusted software (default deny mode); and (iii) allowing the running of software not from the group of malicious software.

In one example aspect, the control rules can also define the categories of access capability for the applications 110: to the resources of a local area network, to remote resources, to the address space of third-party processes, to the control of services and drivers, to the registry of the operating system, to the security policies of the operating system, to the security policies of the operating system, and to the debugging of processes. Each of the mentioned categories is determined by defining the functions used by the application that are provided by the standard system libraries (such as Windows® application programming interface ("API"), which can be determined from the table of imports of the file being executed), and also the condition of use of the mentioned functions such as their arguments) and the application of the set of rules to them. An example is given below of rules allowing one to assign an application 110 to one category or another. The meaning of the column "Criticality assessment" of Table 1 will be explained below.

TABLE 1

| Name of category | Names of the Windows API functions called up by the application, for assigning to the access category and the conditions of their use | Criticality assessment |
|---|---|---|
| to local area network resources | NetShareEnum; NetShareAdd, argument of the function contains the entry "\\"; GetFileAttributes, argument of the function contains the entry "\\192."; CreateFile, argument of the function contains the entry "\\192."; NetShareDel. | 5 |
| to remote resources | URLDownloadToFile; InternetOpenUrl; InternetConnect. | 10 |
| to the address space of third-party processes | WriteProcessMemory; GetProcessImageFileName; SetThreadContext. | 10 |

TABLE 1-continued

| Name of category | Names of the Windows API functions called up by the application, for assigning to the access category and the conditions of their use | Criticality assessment |
|---|---|---|
| to the control of services and drivers | StartService; RegCreateKey, argument of the function contains one of the entries: Registry\Machine\SYSTEM\ControlSet001\Services; SYSTEM\CurrentControlSet\Services; SYSTEM\ControlSet001\Services; Registry\Machine\SYSTEM\CurrentControlSet\Services; SHDeleteValue, argument of the function contains one of the entries: Registry\Machine\SYSTEM\ControlSet001\Services; SYSTEM\CurrentControlSet\Services; SYSTEM\ControlSet001\Services; Registry\Machine\SYSTEM\CurrentControlSet\Services. | 15 |
| to the operating system registry | RegSetValueEx; RegOpenKey; RegCreateKey. | 15 |
| to the security policies of the operating system | SHDeleteValue, argument of the function contains the entry "Software\Policies"; RegSetValueEx, argument of the function contains the entry "Software\Policies". | 15 |
| to the debugging of processes | LookupPrivilegeValue, argument of the function contains the entry "SeDebugPrivilege"; LookupPrivilegeValue, argument of the function contains the entry "SeSystemtimePrivilege". | 20 |

In yet another example aspect, regarding the control rules, the following categories of purpose can additionally be defined for the applications 110: for working/transacting with banks (such as a client for remote control of an account at a bank or remote banking services), for working in peer-to-peer networks (for example, applications for exchange of files by means of the BitTorrent protocol), for exchanging of messages, for implementing voice communications (VoIP—voice over IP), for working with documents (such as Microsoft Word® or Microsoft Visio®), for working with email (such as Microsoft Outlook®), for software development (such as Microsoft Visual Studio®), for web browsing (such as Microsoft Internet Explorer®). In one example aspect, the application 110 may be assigned to one category or another by analysis of information from the resource section, containing information about the file version (FileVersionInfo). In another example aspect, information about the application 110 may be obtained from the file log. The name of the application 110 (or part of the name) obtained by one of the aforementioned methods may afterwards be matched up with one of the categories of purpose. In one example aspect, the information so obtained may be used to determine the categories of purpose if the application 110 is classified as trusted software. An example is presented below for determining the category of purpose for an application 110 from the name of the application 110. The meaning of the column "Criticality assessment" of Table 2 will be explained below.

TABLE 2

| Name of category | Name of application or part of the name | Criticality assessment |
|---|---|---|
| for working with banks | Santander, Société Générale, Citibank, Raiffeisen. | 50 |
| for working in peer-to-peer networks | uTorrent, BitTorrent, BitComet. | 10 |
| for exchange of messages | Hangouts, WhatsApp, Viber, Skype, ICQ. | 30 |
| for voice communications | Skype, Viber, Hangouts. | 20 |
| for working with email | Outlook, The Bat, Thunderbird. | 35 |
| for software development | SDK, Visual Studio, Eclipse. | 50 |
| for web browsing | Internet Explorer, Chrome, Firefox. | 5 |

In yet another example aspect, the category of purpose for an application 110 may be established by comparing the addresses of remote resources (such as the IP addresses or URL—Universe Resource Locator) to which the application 110 is afforded access during its execution, such as update servers. A determination of the category of purpose may be done similarly to the above-described method, where the match is analyzed between the name of the application 110 and a certain category, but taking into account the addresses of remote resources to which access is afforded.

It should be understood to one skilled in the art that any given categorized application 110 may be categorized in more than one of the above-described categories.

In one example aspect, the above-described method of categorization by categories of purpose may be also performed in regard to software which was used in turn to create other software the method of detecting that one software created another was described above). If the software used to create additional software is categorized in one or more example categories, the above-described "parent/child" relation cannot be used to change the group of the created software (e.g., the aforementioned groups of trusted, malicious and unclassified software) according to an example aspect. In another example aspect, such categories are for working in peer-to-peer networks, for exchanging of messages, and for web browsing. Thus, for example, unclassified software created by an application classified as trusted software cannot be deemed to be trusted.

It should be appreciated that it is important to protect a user of computer system 100 from executing malicious software. Accordingly, an analysis is performed of the entire software present on the computer system 100. In one example aspect, this analysis detects unknown software. In one example aspect, software is determined to be unknown if it is an unclassified software, that is, neither trusted software nor malicious software. Accordingly, in order to detect unknown software, each application 110 present on the computer 100 is determined to be trusted, malicious, or unclassified software. The determination of whether applications belong to these groups is performed according to the method described above. In one aspect, if no unclassified software is present on the user's computer 100, the application control module may be used in default deny mode (i.e., allowing the running of only trusted software). In yet another aspect, if only trusted software is present on the user's computer 100, the application control module may be also used in default deny mode.

In contrast, if applications 110 present on the computer system 100 could not be classified (unclassified or unknown software), the disclosed system and method may form control rules for the application control module 120 for such applications according to the example aspect. To form control rules, a categorization may be performed for the software that was not previously recognized as being either trusted or malicious (i.e., for the unclassified/unknown software). In one example aspect, the categorization of the applications 110 is performed to assign the unclassified software to one of the categories of access options described above. In yet another aspect, the categorization of the applications 110 may be performed to assign the software to one of the categories of purpose described above.

In forming the application control rules of the application control module 120 for an unknown application, besides the results of the categorization of the aforementioned applications, the system and method also factors in an evaluation of the user of the computing device, in one aspect, the user evaluation is assigned a numerical evaluation (e.g., a number between 0 and 100 or a number with no upper bound) of the level of computer competence of the user. In one example aspect, the system and method can presuppose that a user with a higher level of computer competence will be less likely to fall victim to malicious objects than a user whose level of computer competence is low. Consequently, the higher the level of computer competence of the user, the more operations (including, for example, calling up certain application functions and executing such an application) are permitted by the application control module 120 in regard to a unclassified software. Computer competence is the totality of knowledge about the functioning of computing devices, the relations between them, including the methods of counteracting malicious objects. Comparing the results of the categorization of each unknown application 110, an overall evaluation of the categorization of the group of applications 110 present on the computer 100, and the numerical evaluation of the user's computer competence, enables the disclosed system and method to define the application control rules for this application 110.

In one example aspect, for the aforementioned user evaluation, the system gathers various information that characterizes the software on the computer 100, including the operating system 140, for example. In one example aspect, such information may include the history of infections and detections of malicious objects from the execution log of the security module 130. In yet another aspect, such information may include the level of rights of the computer user (e.g., whether the user had administrator rights for the computer 100). In yet another aspect, such information may be information from the execution log of the software 110 for network access, specifically, for web browsing (such as the history of visiting pages). In yet another aspect, this information may be determined as the results of a categorization of applications 110 by categories of purpose as discussed above. In another aspect, such information may be data of the user's personal page on social networks, such as FaceBook® (e.g., data about the job or field of employment and duties). In the forming of all the aforementioned information, rules are used to form a final user evaluation. An example is given below of the rules forming an evaluation of the user of a computer 100 on the basis of the aforementioned information. In one example aspect, it is assumed that the initial user evaluation is a fixed number, such as 0, for example.

TABLE 3

| Condition for changing evaluation | Value of change |
|---|---|
| No instance of detection of malicious objects on the computer has been recorded in the past four months. | +20 |
| There have been instances of detecting malicious objects on the computer during each of the past four months. | −30 |
| The computer user has administrator rights. | +24 |
| The computer user visited untrusted Internet resources in the past month. | −10 |
| There have been more than 5 visits to resources for banking operations in the past month. | −5 |
| A software development application is present on the user's computer. | +20 |
| An application for working with banks is present on the user's computer. | −15 |
| The personal page of the user of the computer 100 in a social network indicates a job related to information technologies. | +7 |
| The personal page of the user of the computer 100 in a social network indicates a job containing "developer" in its title. | +25 |

In one example aspect, un rusted resources are internet resources to which access is blocked by the security module 130, for example, because of presence of malicious code in the pages downloaded. In another aspect, a resource for performing banking operations is a resource whose first-level domain from the unified resource locator (URL) is at least: "tcsbank.ru", "bm.ru", "sbrf.ru" in another aspect, a job relating to information technologies is an organization whose title contains at least: "Google®", "Kaspersky", "Microsoft®", and "Apple®".

It should be understood that the above-given rules are merely examples of how to transform the information gathered into a user evaluation, including how to use the mentioned information sources. Accordingly, the goal of using such rules is an evaluation of the user in the context of his level of computer competence, i.e., the higher the evaluation of the competence level the greater the likelihood that the user of the computer 100 will not become a victim of malicious objects during his use of the computer 100 and the applications 110.

It should also be noted that, in one example aspect, all of the rules exemplified by Table 1, Table 2, and Table 3, including the numerical values used by the rules, may be defined (formulated) by a person. In another aspect, such rules may be automatically formulated.

When defining the application control rules of the application control module 120 for an unclassified/unknown software, the relationship is considered between the user evaluation and the categories of the applications 110 (access and purpose) that are present on the computer 100. For this task one can use an assessment of the criticality of the software that can show how dangerous it is to use software or its individual components if said software has been recognized as being unclassified. In one example aspect, this assessment is a numerical evaluation, such as a number between 0 and 100, or a number with no upper bound. The criticality assessment for each application 110 is formulated on the basis of criticality assessments of the categories in which this application 110 appears, and it is computed by the method of combination of criticality assessments of the mentioned categories (shown in Table 1 and Table 2). In one aspect, the criticality assessment of an application 110 is a power series of criticality assessments of the categories of this application 110:

$$C = \Sigma a_i C_i^{b_i},$$

where C is the criticality assessment, $C_i$ is the criticality assessment of the i-th category, $a_i$ is a weighting factor for the i-th category (in one example aspect, in the interval of 0 to 1), and $b_i$ is an exponent for the i-th category (in one example aspect, a number greater than 0.5).

In another example aspect, the criticality assessment of an application 110 may be defined as a sum of criticality assessments of the categories of the application 110 divided by the sum of criticality assessments of all known categories and multiplied by a correction factor (such as 100).

In one example aspect, when formulating the control rules of the application control module 120 for unknown software, a comparison may be made of the criticality assessment of the application and the user evaluation. For example, if the product of the coefficient (such as 1.5) by the criticality assessment of the application 110, raised to a power (such as 1.1), is greater than the user evaluation, then a rule is formulated whereby the application control module 120 denies the use of the unknown application 110. Otherwise, a rule may be formulated whereby the use of the application 110 is allowed.

In yet another example aspect, the criticality assessment of the application is not used to define the control rules of the application control module 120 for the unknown application 110, but only the criticality assessments of the access categories: the control rules do not control the possibility of running a example application 110 as a whole, but the possibility of this application using functions from each specific access category, as shown in Table 1 (column 2). Thus, in one example aspect, if $$A > a_i C_i,$$

where A is the user evaluation, $C_i$ is the criticality assessment of the i-th access category, and $a_i$ is the coefficient for the i-th category (for example, 10), then a rule is formulated whereby the application control module 120 denies the use by the application 110 of functions from this (i-th) access category. Otherwise, a rule is formulated whereby the application control module 120 allows the application 110 to use functions from the aforesaid category (i-th category).

The control rules formulated by the methods described above for the application control module 120 for unknown software are then presented to the application control module 120. The application control module 120 is then used in accordance with the previously formulated control rules.

It should be appreciated that the control rules can be changed, for example, if information used to formulate the user evaluation or the criticality assessment of the application 110 (and also the criticality assessment of the application categories) changes. In one aspect, the formulation of new control rules is done by repeating the steps of the method as described above to formulate control rules of the application control module 120 for unknown software.

Figure 2:
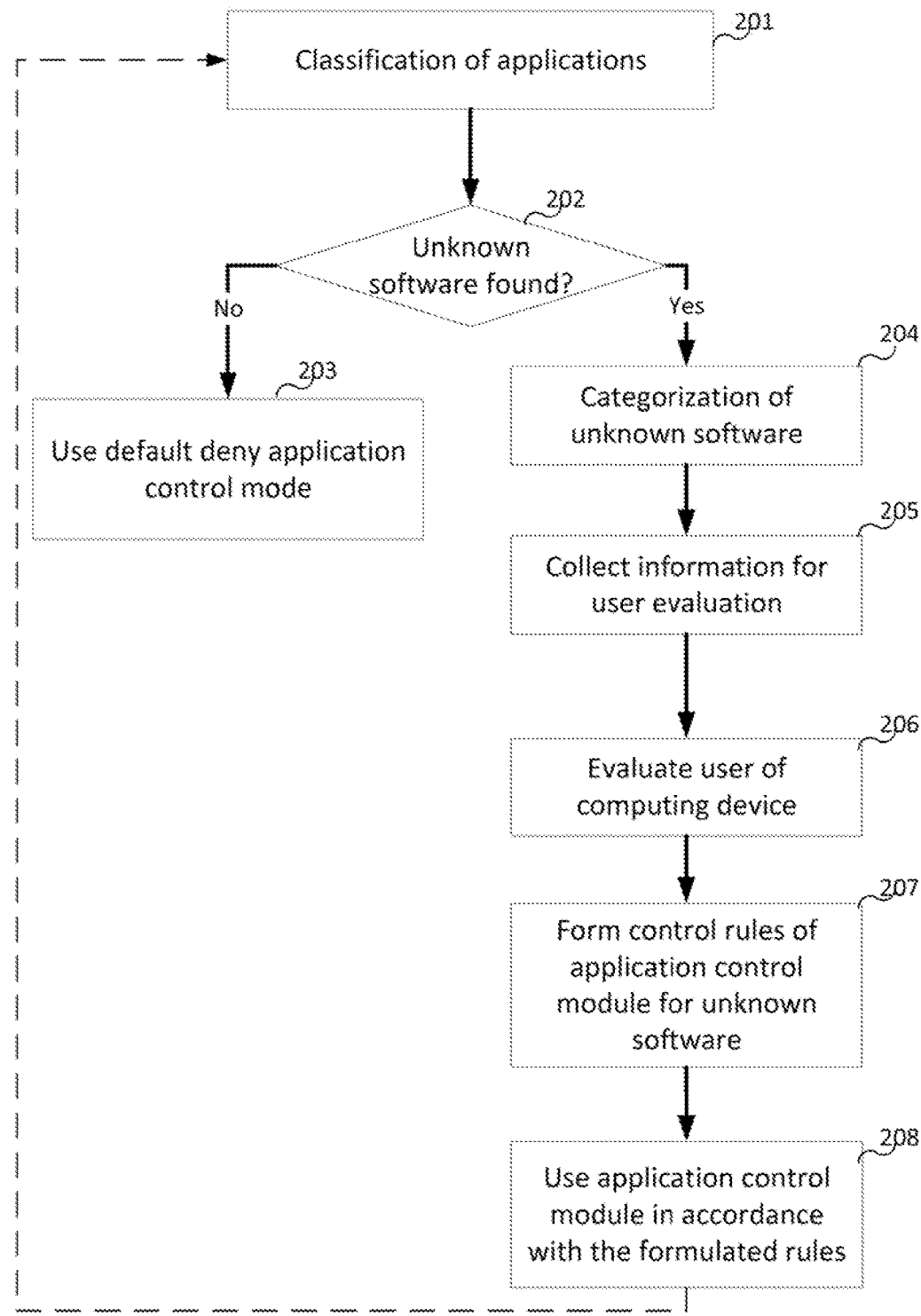
FIG. 2 illustrates a flow diagram for configuring control rules for applications executable on a computer.

FIG. 2 illustrates a flow diagram for configuring control rules for applications executable on a computer according to an example aspect. As shown, in step 201, a classification is made of the applications 110 in order to identify a corresponding group for each application 110, i.e., trusted software, malicious software, or unclassified software. In step 202, unknown software is detected. In this step, unknown software is considered to be software from the group of unclassified software. If no such applications are found, then in step 203 the application control module 120 is used according to the default deny rule (i.e., allowing the running of only trusted software). In contrast, if unknown applications are found, then in step 204 a categorization of these applications is done (by access and by purpose). Next, in step 205, information is gathered for the user evaluation that is then used in step 206 to form the user evaluation in the context of computer competence. This evaluation allows users with a higher level of computer competence to be trusted with the running of unknown applications (or their components). Next, in step 207, the control rules are defined/formed for the application control module 120 for unknown applications in accordance with the obtained user evaluation, and also the criticality assessment of the unknown applications. Finally, at step 208, the application control module 120 is used according to the previously formulated application control rules for the unknown software. This operational flow can be repeated as shown in FIG. 2.

Figure 3:
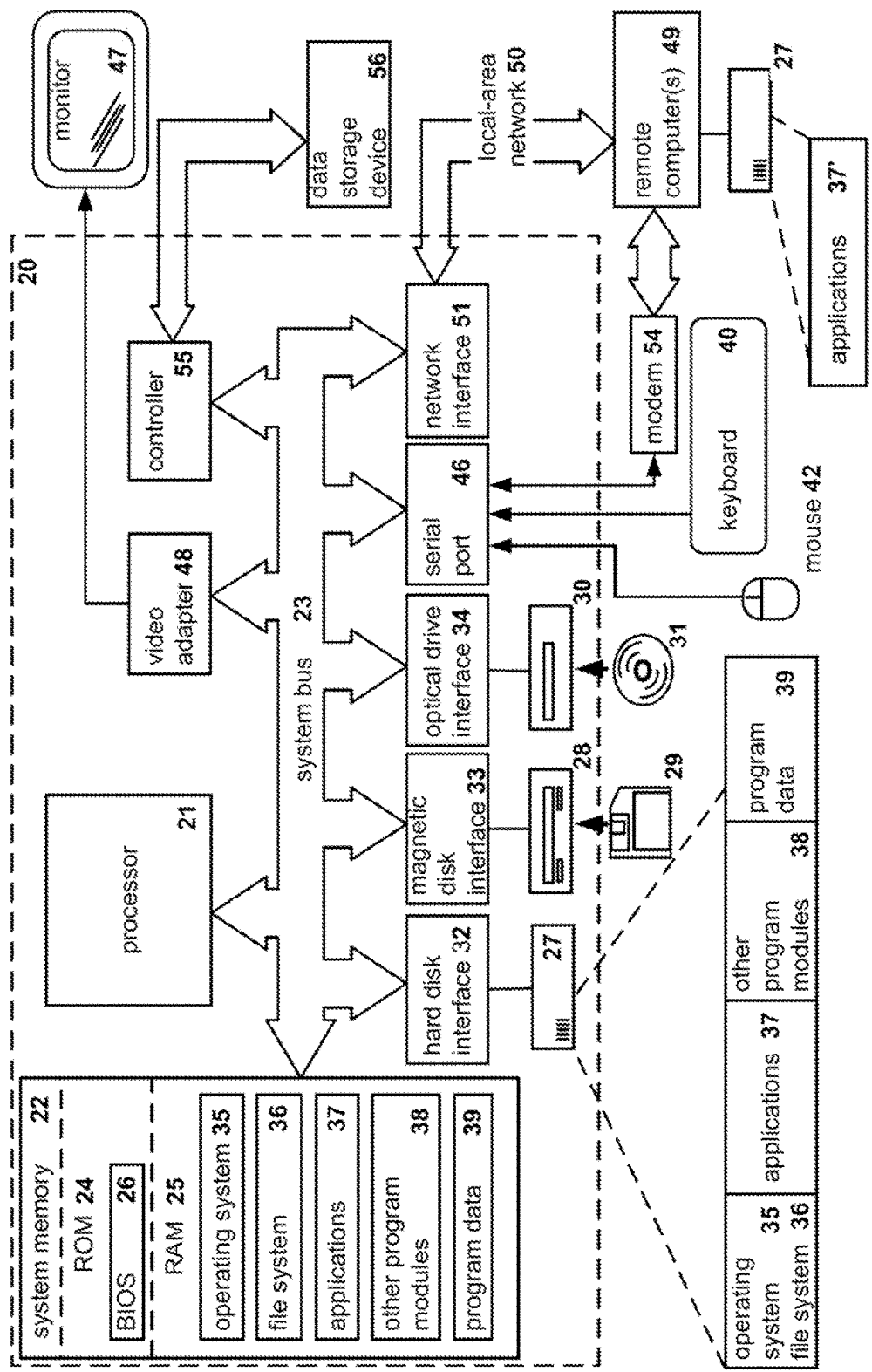
FIG. 3 illustrates an example of a general-purpose computer system on which the disclosed systems and method can be implemented.

FIG. 3 illustrates an example of a general-purpose computer system (which may be a personal computer or a server) on which the disclosed systems and method can be implemented according to an example aspect. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for configuring control rules for applications executable on a computer, the method comprising:
classifying, by the hardware processor, at least one computer application into one of a plurality of classification groups that include a trusted classification group, a malicious classification group, and an unknown classification group;
configuring, by the hardware processor, at least one control rule when the at least one application is classified in the unknown classification group by:
determining, a computer competency score for a user of the computer, wherein the computer competency score comprises a numerical evaluation indicating a level of computer competence of the user;
categorizing, based on system library application programming interface (API) functions used by the at least one application, the at least one application into a plurality of categories, wherein at least one category indicates an access capability of the at least one application;
calculating, a criticality score of the at least one application as a sum of the criticality scores of the categories in which of the at least one application appears divided by a sum of criticality scores of all predefined categories and multiplied by a correction factor; and
generating the at least one control rule for the at least one application that denies use of the application based on a comparison of the determined computer competency score for the user and the calculated criticality score of the at least one application; and
blocking execution of the at least one application based on the generated control rule.

2. The method of claim 1, wherein the user information includes one or more of a security access level of the user, a social network profile information of the user, and a personal information of the user.

3. The method of claim 2, wherein the social network profile information of the user and/or the personal information of the user includes at least one of job position, company name, and field of work of the user.

4. The method of claim 1, wherein the determining of the computer competency score of the user is further based on the computer information comprising at least one of computer security event log, network resources access log, and the one or more predefined categories of the at least one application.

5. The method of claim 1, wherein the criticality score of a second application is calculated as a power series according to:

$$C = \Sigma a_i C_i^{b_i},$$

wherein C is the criticality score, $a_i$ is a weight of i-th category, $C_i$ is a criticality score of i-th category, and $b_i$ is a power coefficient for i-th category.

6. A system for configuring control rules for applications executable on a computer, the system comprising:
a hardware processor configured to:
classify at least one computer application into one of a plurality of classification groups that include a trusted classification group, a malicious classification group, and an unknown classification group;
configure at least one control rule when the at least one application is classified in the unknown classification group by:
determining a computer competency score for a user of the computer, wherein the computer competency score comprises a numerical evaluation indicating a level of computer competence of the user;
categorizing, based on system library application programming interface (API) functions used by the at least one application, the at least one application into a plurality of categories, wherein at least one category indicates an access capability of the at least one application;
calculating a criticality score of the at least one application as a sum of the criticality scores of the categories in which of the at least one application appears divided by a sum of criticality scores of all predefined categories and multiplied by a correction factor; and
generating the at least one control rule for the at least one application that denies use of the application based on a comparison of the determined computer competency score for the user and the calculated criticality score of the at least one application; and
block execution of the at least one application based on the generated control rule.

7. The system of claim 6, wherein the user information includes one or more of a security access level of the user, a social network profile information of the user, and a personal information of the user.

8. The system of claim 7, wherein the social network profile information of the user and/or the personal information of the user includes at least one of job position, company name, and field of work of the user.

9. The system of claim 6, wherein the determining of the computer competency score of the user is further based on computer information comprising at least one of computer security event log, network resources access log, and the one or more predefined categories of the at least one application.

10. The system of claim 1, wherein the criticality score of a second application is calculated as a power series according to:

$$C = \Sigma a_i C_i^{b_i},$$

wherein C is the criticality score, $a_i$ is a weight of i-th category, $C_i$ is a criticality score of i-th category, and $b_i$ is a power coefficient for i-th category.

11. A non-transitory computer readable medium storing computer executable instructions for configuring control rules for applications executable on a computer, including instructions for:
classifying, by the hardware processor, at least one computer application into one of a plurality of classification groups that include a trusted classification group, a malicious classification group, and an unknown classification group;
configuring, the hardware processor, at least one control rule when the at least one application is classified in the unknown classification group by:
wherein the configuring of the at least one control rule includes:
determining, by the hardware processor, a computer competency score for a user of the computer, wherein the computer competency score comprises a numerical evaluation indicating a level of computer competence of the user;
categorizing, based on system library application programming interface (API) functions used by the at least one application, the at least one application into a plurality of categories, wherein at least one a first category indicating indicates an access capability of the at least one application;
categorizing, based on a match of at least a portion of a name of the application, the at least one application into a second category indicating a purpose of the at least one application;
calculating, by the hardware processor, a criticality score of the at least one application based on as a sum of the criticality scores of the categories in which of the at least one application appears and corresponding weights of the categories divided by a sum of criticality scores of all predefined categories and multiplied by a correction factor; and
generating the at least one control rule for the at least one application that denies use of the application based on a comparison of the determined computer competency score for the user and the calculated criticality score of the at least one application; and
blocking execution of the at least one application based on the generated control rule.

12. The medium of claim 11, wherein the criticality score of a second application is calculated as a power series according to:

$$C = \Sigma a_i C_i^{b_i},$$

wherein C is the criticality score, $a_i$ is a weight of i-th category, $C_i$ is a criticality score of i-th category, and $b_i$ is a power coefficient for i-th category.

13. The method of claim 1, wherein the categorizing of the at least one application further comprises:
determining a category of purpose of the at least one application based on a remote resource to which the at least one application is afforded access; and
categorizing the at least one application based on the determine category of purpose.

14. The system of claim 6, wherein the processor configured to categorize of the at least one application is further configured to:
determine a category of purpose of the at least one application based on a remote resource to which the at least one application is afforded access; and
categorize the at least one application based on the determine category of purpose.

15. The method of claim 1, wherein categorizing the at least one application further comprises categorizing, based on a match of at least a portion of a name of the application, the at least one application into a second category indicating a purpose of the at least one application.

16. The system of claim 6, wherein the processor configured to categorize the at least one application is further configured to categorize, based on a match of at least a portion of a name of the application, the at least one application into a second category indicating a purpose of the at least one application.

17. The medium of claim 11, wherein the instructions for categorizing the at least one application further comprises instructions for categorizing, based on a match of at least a portion of a name of the application, the at least one application into a second category indicating a purpose of the at least one application.

* * * * *